(12) United States Patent
Raman et al.

(10) Patent No.: US 10,063,699 B1
(45) Date of Patent: Aug. 28, 2018

(54) METHOD, APPARATUS AND COMPUTER PROGRAM PRODUCT FOR VERIFYING CALLER IDENTIFICATION IN VOICE COMMUNICATIONS

(71) Applicant: EMC IP HOLDING COMPANY LLC, Hopkinton, MA (US)

(72) Inventors: Haim Raman, Natanya (IL); Yihezkel Schoenbrun, Raanana (IL); Julia Roschak, Raanana (IL); Itzkik Sorani, Kadima (IL); Tamar Vardy, Tel Aviv (IL); Mikael Peres, Raanana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/490,145

(22) Filed: Apr. 18, 2017

(51) Int. Cl.
| | |
|---|---|
| *H04M 1/00* | (2006.01) |
| *H04M 15/00* | (2006.01) |
| *H04M 3/436* | (2006.01) |
| *H04L 29/06* | (2006.01) |
| *H04L 9/32* | (2006.01) |
| *H04M 3/22* | (2006.01) |

(52) U.S. Cl.
CPC .......... *H04M 3/436* (2013.01); *H04L 9/3263* (2013.01); *H04L 63/0428* (2013.01); *H04M 3/2281* (2013.01); *H04L 2463/121* (2013.01); *H04M 2203/6027* (2013.01)

(58) Field of Classification Search
CPC ..... H04W 12/02; H04W 12/04; H04W 12/06; H04W 12/08; H04W 8/18; H04W 12/12
USPC .... 379/114.19, 114.21, 142.01, 142.05, 245, 379/247, 93.23, 88.17, 88.1, 142.04, 379/142.06, 145; 455/410, 411, 414.1, 455/415, 445
See application file for complete search history.

(56) References Cited

U.S. PATENT DOCUMENTS

| | | | | |
|---|---|---|---|---|
| 5,671,285 | A * | 9/1997 | Newman | G06Q 20/0855 380/243 |
| 7,330,971 | B1* | 2/2008 | Kukreja | H04L 63/083 709/203 |
| 9,232,394 | B2 * | 1/2016 | Bombacino | H04W 12/06 |
| 2003/0156707 | A1* | 8/2003 | Brown | H04M 3/42 379/265.06 |
| 2006/0262929 | A1* | 11/2006 | Vatanen | H04L 63/0823 380/255 |

(Continued)

*Primary Examiner* — Binh Kien Tieu
(74) *Attorney, Agent, or Firm* — Krishnendu Gupta; Jason A. Reyes

(57) ABSTRACT

Techniques are disclosed for verifying caller identification in voice communications. In one embodiment, there is disclosed a method comprising receiving a request to establish a voice call between communications devices. The request comprising encrypted information and an identifier identifying a caller associated with the request to establish the voice call. The method further comprises retrieving, in response to receiving the request, a decryption key from an authentication source by requesting from the authentication source the decryption key associated with the identifier. The method further comprises utilizing the decryption key to decrypt the encrypted information and produce decrypted information as well as comparing the decrypted information and the identifier to determine a similarity therebetween. The method further comprises providing, based on the comparison, an indication of whether or not the request is deemed associated with fraud.

15 Claims, 3 Drawing Sheets

(56) References Cited

U.S. PATENT DOCUMENTS

| | | | | |
|---|---|---|---|---|
| 2007/0129966 | A1* | 6/2007 | Walker | G06Q 10/10 |
| | | | | 705/321 |
| 2008/0181379 | A1* | 7/2008 | Chow | H04L 63/0823 |
| | | | | 379/142.05 |
| 2009/0113063 | A1* | 4/2009 | Yeh | H04L 63/0807 |
| | | | | 709/229 |
| 2011/0145581 | A1* | 6/2011 | Malhotra | H04L 63/126 |
| | | | | 713/171 |
| 2014/0052640 | A1* | 2/2014 | Pitroda | G06Q 20/02 |
| | | | | 705/67 |
| 2014/0177838 | A1* | 6/2014 | Walker | H04K 1/00 |
| | | | | 380/257 |
| 2014/0281577 | A1* | 9/2014 | Nicholes | G06F 21/71 |
| | | | | 713/189 |
| 2016/0050187 | A1* | 2/2016 | Altberg | H04M 7/0036 |
| | | | | 380/255 |
| 2016/0241402 | A1* | 8/2016 | Gordon | H04L 9/3228 |

* cited by examiner

METHOD, APPARATUS AND COMPUTER PROGRAM PRODUCT FOR VERIFYING CALLER IDENTIFICATION IN VOICE COMMUNICATIONS

TECHNICAL FIELD

The present invention relates generally to voice communications. More particularly, the present invention relates to a method, an apparatus and a computer program product for verifying caller identification in voice communications.

BACKGROUND OF THE INVENTION

Recent scams show the existence of a sophisticated, determined, innovative and well organized crime underworld. Fraudsters are more adaptive than ever, modifying their modus operandi and techniques quickly to exploit new vulnerabilities. While the fraudsters do not limit themselves to a specific sector, their focus tends to be on sectors including banking and financial accounts, government services, ISPs, telecom companies and healthcare and many others.

Reports about identity takeover, filled with phrases like Trojan, Man in the Middle, Man in the Browser, and Phishing, are increasingly in the news. However, the threats are not always so sophisticated. For example, a pretty significant percentage of all fraudulent activity simply involves fraudsters calling an unsuspecting member of the public pretending to be someone they are not. One common scam involves a fraudster pretending to be an IRS representative threatening heavy fines and jail time if the targeted person doesn't perform a certain act as suggested by the fraudster.

Unfortunately, although the above scams are crude and simple in their approach, they are also very effective due to the fact that the caller identification (ID) value is often spoofed. The spoofed ID gives the target of the scam a false sense of security as they believe the caller is who they say they are. The targets of these scams are often elderly and vulnerable persons and the impact can be devastating to these persons. There is, therefore, a need to address this problem.

SUMMARY OF THE INVENTION

There is provided a method, comprising: receiving, by processing circuitry, a request to establish a voice call between communications devices, the request comprising encrypted information and an identifier identifying a caller associated with the request to establish the voice call; in response to receiving the request, retrieving, by processing circuitry, a decryption key from an authentication source by requesting from the authentication source the decryption key associated with the identifier; utilizing, by processing circuitry, the decryption key to decrypt the encrypted information and produce decrypted information; comparing, by processing circuitry, the decrypted information and the identifier to determine a similarity therebetween; and based on the comparison, providing, by processing circuitry, an indication of whether or not the request is deemed associated with fraud.

There is also disclosed an apparatus, comprising: memory; and processing circuitry coupled to the memory, the memory storing instructions which, when executed by the processing circuitry, cause the processing circuitry to: receive a request to establish a voice call between communications devices, the request comprising encrypted information and an identifier identifying a caller associated with the request to establish the voice call; in response to receiving the request, retrieve a decryption key from an authentication source by requesting from the authentication source the decryption key associated with the identifier; utilize the decryption key to decrypt the encrypted information and produce decrypted information; compare the decrypted information and the identifier to determine a similarity therebetween; and based on the comparison, provide an indication of whether or not the request is deemed associated with fraud.

There is also disclosed a computer program product having a non-transitory computer readable medium which stores a set of instructions, the set of instructions, when carried out by processing circuitry, causing the processing circuitry to perform a method of: receiving a request to establish a voice call between communications devices, the request comprising encrypted information and an identifier identifying a caller associated with the request to establish the voice call; in response to receiving the request, retrieving a decryption key from an authentication source by requesting from the authentication source the decryption key associated with the identifier, utilizing the decryption key to decrypt the encrypted information and produce decrypted information; comparing the decrypted information and the identifier to determine a similarity therebetween; and based on the comparison, providing an indication of whether or not the request is deemed associated with fraud.

BRIEF DESCRIPTION OF THE DRAWINGS

The invention will be more clearly understood from the following description of preferred embodiments thereof, which are given by way of examples only, with reference to the accompanying drawings, in which.

DETAILED DESCRIPTION

Figure 1:
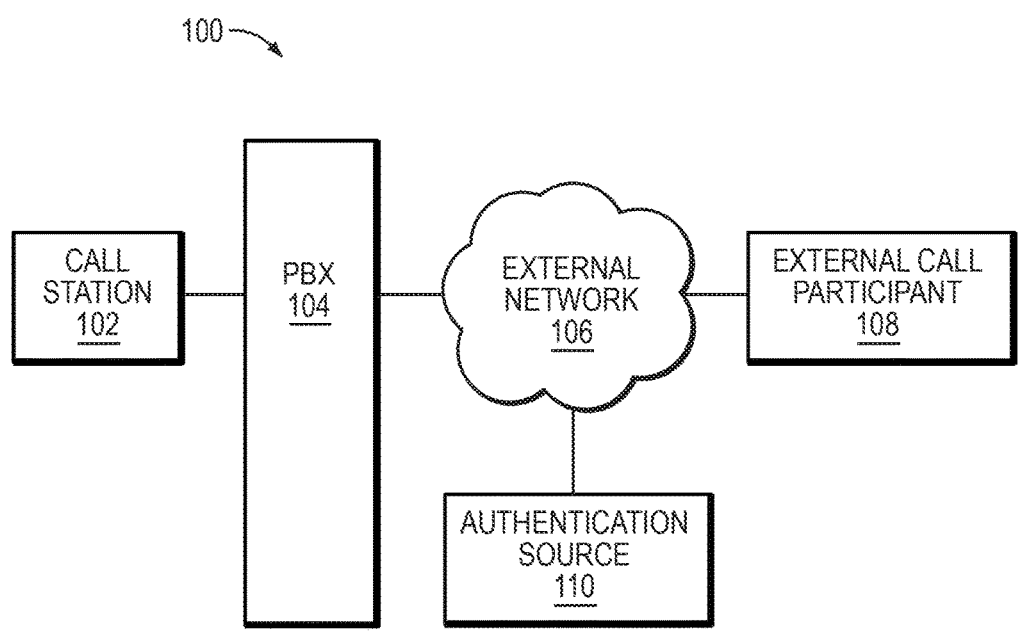
FIG. 1 is a block diagram showing particular components of an electronic environment.

FIG. 1 is a block diagram illustrating an embodiment of an electronic environment 100. The electronic environment 100 comprising a call station 102 connected to a PBX 104 that in turn is connected to an external network 106. It should be noted that only one call station 102 is illustrated in the figure but any number of call stations may exist. In this embodiment, the PBX 104 routes calls between any devices connected to the PBX 104 and also routes calls to and from the external network 106. External network 106 may include one or more of the following: a direct or indirect physical communication connection, mobile communication network, public switched telephone network, PBX phone network, Voice-over-IP network, Internet, intranet, LAN, WAN, and any other forms of connecting two or more systems together. For example, in one embodiment, the external network 106 comprises the public switched telephone network and the internet as will be explained further below.

The electronic environment 100 also comprises an external call participant 108 and an authentication source 110 connected to the external network 106. As discussed above, in one embodiment, the external network 106 comprises the public switched telephone network and the internet such that the external call participant 108 can communicate over the telephone network with the call station 102 and the external call participant 108 can communicate over the internet with the authentication source 110. Any number of external call participants 108 may also exist. The external call participant 108 in this particular embodiment includes any call station not directly connected to PBX 104, including mobile telephones, telephones at a remote fixed location, computers, pagers, personal digital assistants, and/or any devices able to send and receive telephonic data. The authentication source 110 comprises a certificate authority (CA).

During operation, a caller identity associated with a caller from the call station 102 can be verified at the external call participant 108 using public key infrastructure (PKI). Each caller at the respective call stations 102 possesses a unique identifier produced for the caller by combining a caller identifier and an organization identifier in a manner similar to the composition of an e-mail address. For example, the caller may be associated with a unique identifier, such as 'jhon56.mycallcenter.com', 'frank.mycallcenter.com', 'alis.mycallcenter.com', etc. The organization creates a public-private key pair for the caller. The caller's public key is then signed by a trusted root CA and the public key is associated with the unique identifier.

Next, the call station 102 initiates a call with the external call participant 108 by first appending a time stamp to the unique identifier of the caller and encrypting this appended information using the appropriate private key of the public-private key pair. The call station 102 in turn sends a request to establish a call over the external network 106 to the external call participant 108. For example, the request may be sent over the telephone network as discussed above in order to facilitate communication with the external call participant 108. The request comprises the encrypted information together with a professed plaintext unique identifier and a time stamp.

In response to receiving the request over the external network 106, the external call participant 108 takes the professed plaintext unique identifier it receives from the call station 102 and uses it to index into the CA 110 to retrieve the public key associated with that unique identifier such that it can use that public key to decrypt the received encrypted information. If the decrypted information matches (i) the received plaintext unique identifier and (ii) the time stamp, the request to establish the call is deemed genuine.

This process happens seamlessly and transparently to an end-user. If the caller sends their identification details using this approach, the verification of these details as outlined above happens automatically within the first few seconds of the call ring time. If the identification is successfully verified, the underlying system provides a message indicating the identity of the caller has been verified (e.g., similar to a modern web browser's "green lock" icon). If the identification details were not successfully verified, the underlying system provides a message indicating that the caller's identity has not been verified, with a warning that the caller likely has nefarious intentions. If the caller does not send their identification details using this approach, the underlying system cannot properly verify their identity, and therefore provides a warning that it could not be verified.

Figure 2:
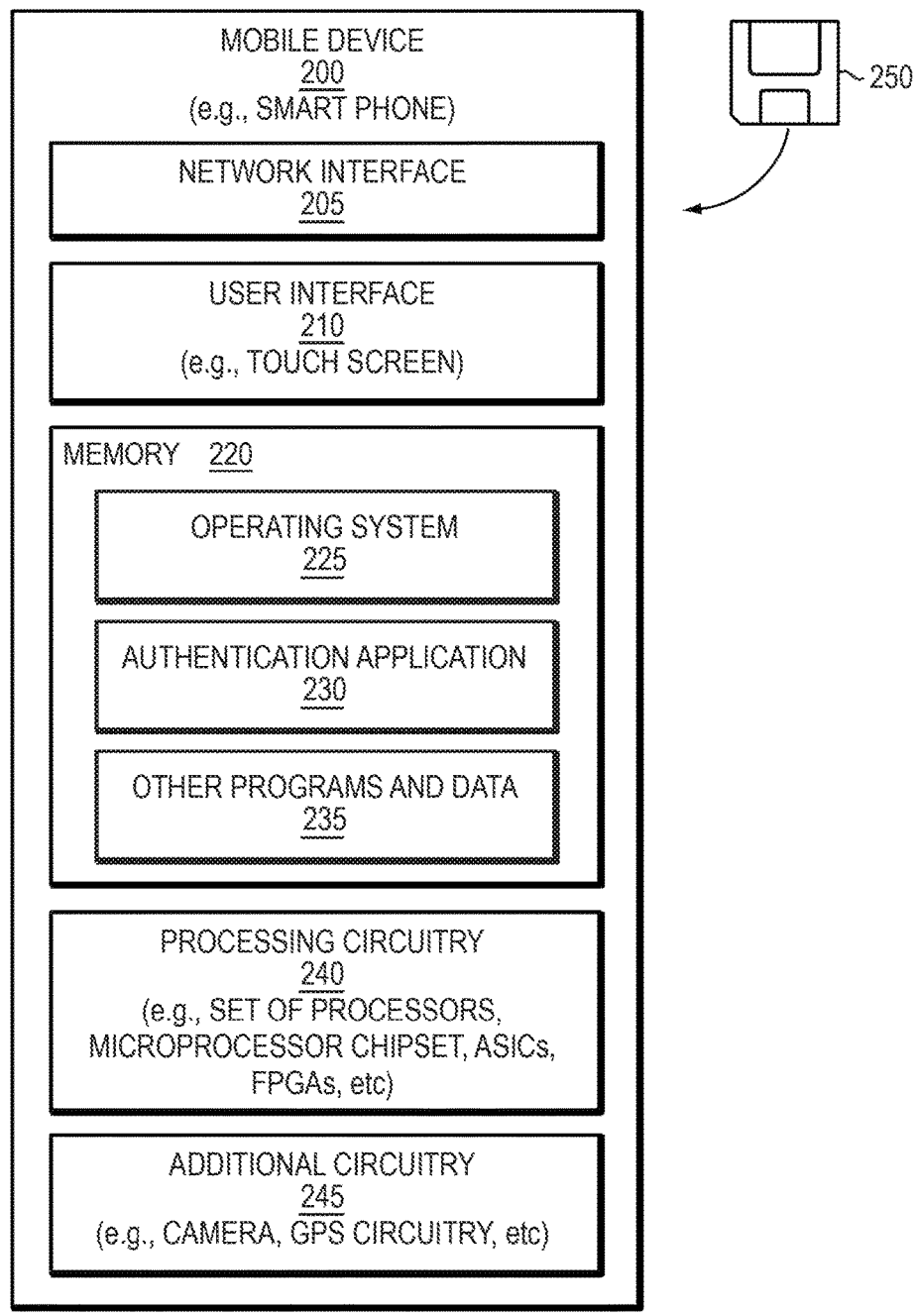
FIG. 2 is a block diagram illustrating particular details of a mobile device associated with the external call participant of FIG. 1.

FIG. 2 is a block diagram illustrating particular details of a mobile device 200 associated with the external call participant 108 of FIG. 1. The mobile device 200 includes a network interface 205, a user interface 210, memory 220, processing circuitry 240, and additional circuitry 245. The architecture and/or form factor for the mobile device 200 may be that of a smartphone, or the like.

The network interface 205 is constructed and arranged to connect the mobile device 200 to the external network 106 (FIG. 1). Accordingly, the network interface 205 enables the mobile device 200 to communicate with the other components of the electronic environment 100. Such communications may be copper-based or wireless (i.e., IP-based, SAN-based, cellular, Bluetooth, combinations thereof, and so on).

The user interface 210 is constructed and arranged to receive input from a user and provide output to the user. In the context of a smartphone, the user interface 210 may be formed by components such as a touch screen, and so on.

The memory 220 is intended to represent both volatile storage (e.g., DRAM, SRAM, etc.) and non-volatile storage (e.g., flash memory, magnetic disk drives, etc.). The memory 220 stores a variety of software constructs including an operating system 225, authentication application(s) 230, and other programs and data 235.

The processing circuitry 240 is constructed and arranged to operate in accordance with the various software constructs stored in the memory 220. In particular, the processing circuitry 240, when executing the operating system 225, manages various resources of the mobile device 200 (e.g., memory allocation, processor cycles, etc.). Additionally, the processing circuitry 240 executing the application(s) 230 forms specialized circuitry to facilitate authentication or verification of the identity of the caller as discussed above.

It should be understood that the above-mentioned processing circuitry 240 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 250 is capable of delivering all or portions of the software to the mobile device 200. The computer program product 250 has a non-transitory and non-volatile computer readable medium which stores a set of instructions to control one or more operations of the mobile device 200. Examples of suitable computer readable storage media include tangible articles of manufacture and apparatus which store instructions in a non-volatile manner such as CD-ROM, flash memory, disk memory, tape memory, and the like.

The additional circuitry 245 includes a camera and perhaps other specialized circuitry. The other specialized circuitry can include GPS circuitry, a microphone and a speaker for audio input/output (I/O), a set of accelerometers, a fingerprint scanner, an antenna, and so on. Further details will now be provided with reference to FIG. 3.

Figure 3:
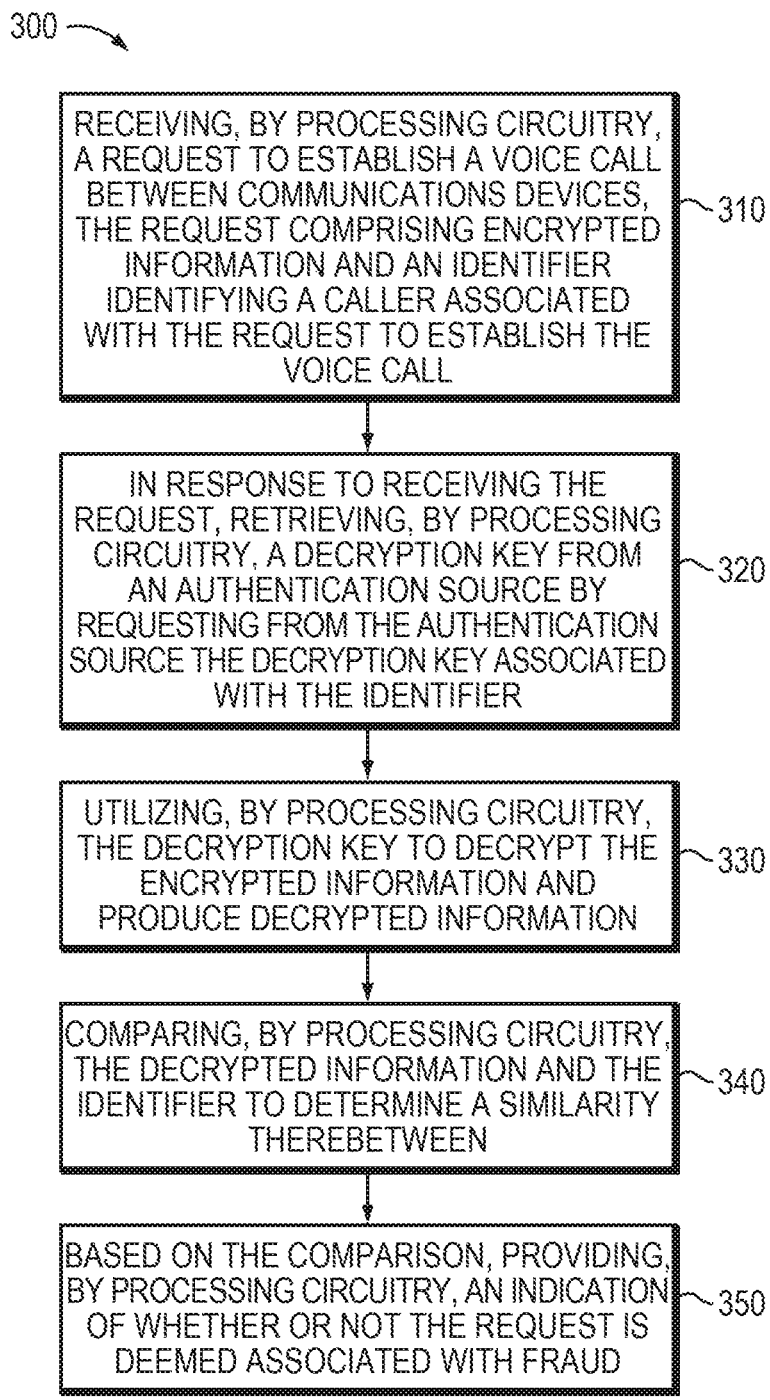
FIG. 3 is a flowchart of a procedure which is performed by the mobile device of FIG. 2.

FIG. 3 illustrates a method 300 for use in for verifying caller identification in voice communications. The method 300 may be performed by the software constructs described in connection with FIG. 2, which reside in the memory 220 of the mobile device 200 and are run by the processing circuitry 240. The method 300 contains steps 310, 320, 330, 340 and 350.

At step 310, a request is received to establish a voice call between communications devices. The request comprising encrypted information and an identifier identifying a caller associated with the request to establish the voice call. At step 320, a decryption key is retrieved from an authentication source in response to receiving the request. The retrieving includes requesting from the authentication source the decryption key associated with the identifier. For example, the authentication source may comprise a certificate authority. At 330, the decryption key is utilized to decrypt the encrypted information and produce decrypted information. At 340, the decrypted information and the identifier are compared to determine a similarity therebetween. At step 350, based on the comparison, an indication is provided of whether or not the request is deemed associated with fraud.

In use, the mobile device 200 (e.g. smartphone, internet-connected phone, etc.) is fitted or retrofitted to implement the method 300 as discussed above. Here, the mobile device 200 receives, from another communications device, a request to establish a call that includes a plaintext identifier identifying a caller and information encrypted by an encryption key (i.e., private key) of a public-private key pair. The mobile device 200 responds to the request by retrieving the decryption key (i.e., the public key) associated with the identifier from the certificate authority in connection with the public-private key pair. The mobile device 200 decrypts the encrypted information with the assistance of the decryption key and in turn compares the decrypted information with the identifier. If the identifier and the decrypted information are similar, the mobile device 200 provides an indication that the request to establish the call is deemed genuine. For example, the mobile device 200 may provide a visual indicator that the request is genuine. The mobile device 200 may also simply allow the call to be established or the call to continue if it has already been established. On the other hand, if the comparison indicates that the identifier and the decrypted information are not similar, the mobile device 200 may provide an indication that the request is deemed fraudulent. The indication in this case may result in the request being rejected, or if the call has already been established the call being cancelled, or simply a visual indication may be presented by the mobile device 200 that the request is fraudulent.

While the previous paragraph describes the request as comprising a plaintext identifier and encrypted information (i.e., encrypted identifier), it should be appreciated as discussed in other paragraphs that the encrypted information may also include a time stamp encrypted by the private key and a plaintext time stamp may also form part of the request. In such a case, there would be at least three pieces of data: encrypted information (i.e., encrypted identifier and encrypted time stamp), plaintext identifier and plaintext time stamp. Once the encrypted information is decrypted then the decrypted data is compared with the plaintext identifier and time stamp. The indication as provided as to whether or not the request is deemed associated with fraud will in this instance be based on this comparison.

Advantageously, the above method enables an end user to be confident that the caller is genuinely who they claim to be. The method is, therefore, effective in reducing the amount of scams involving the spoofing of call IDs. Another tremendous additional benefit of this approach is the elimination of the need for a unique phone number per-individual in order to uniquely identify that individual. Fewer phone numbers would therefore need to be in use. For example, a mid-sized company providing unique phone numbers to each employee (which can become expensive) can instead use one phone number, with employees being uniquely identifiable to those they call via their PKI certificate as used by this approach.

In the following example of the above method, suppose John is working at mycallcenter.com and his unique identifier within mycallcenter is john56. Mycallcenter will create a key pair for John. The public component of the key will be signed by a trusted Root CA and a resulting certificate will be associated with john56.mycallcenter.com. The certificate may include some additional information like John's full name and company address. The private part of the key pair will be stored on their Private Branch Exchange (PBX). Optionally, with the right software and hardware, it can be stored in the phone itself.

Next, suppose John would like to call Emily to sell her mycallcenter's latest service. Emily picks up John's call on her smartphone. Mycallcenter's PBX will encrypt John's unique identifier and the call's timestamp in GMT, as follows: enc=encrypt(john56.mycallcenter.com, 2016113045). Thus, the PBX will populate the binary value of enc, john56.mycallcenter.com in the caller ID. Emely's phone will receive the call, extract the caller ID, and use John's identifier john56.mycallcenter.com to index into the CA to retrieve John's public key. Using the public key as retrieved, Emily's phone decrypts the received encrypted value to john56.mycallcenter.com, 2016113045. The decrypted value matches the received plaintext john56.mycallcenter.com, 2016113045, confirming to Emily that the caller is indeed who they say they are and a green lock indication will be displayed alongside the caller details. Emily can answer the call safely.

The above approach can also be adapted to guard against Man in the Middle attacks. For example, an attacker could theoretically sit between John and Emily, receive the encrypted string from John, hang up the call with John, call Emily immediately without delay and pass the encrypted string that John had sent to Emily. Now the attacker has a call with Emily, and Emily thinks the person on the other end is John.

To guard against such a scenario, telephony standard specifies that caller ID information is sent no earlier than a specific time into the call and this feature can be exploited to block Man in the Middle attacks. Specifically, as long as the tolerance on Emily's end is smaller than twice the minimum time until the caller ID information can be sent, a Man in the Middle attack would fail. The earliest the attacker can be in a phone call with the recipient is the amount of time it takes to receive the encrypted string from the caller John plus the minimum amount of time until Emily will receive that encrypted string from the attacker. By then, the time in the decrypted string is at least twice the minimum time until the caller ID information can be sent, and a rule on the recipient's phone can reject the call as fraudulent for having too old of a timestamp.

For example, when John calls Emily (no man in the middle), the caller Id is passed between the second and third ringtone (let's say 4 sec) so a time stamp can be taken when this information arrives at 108 so it can be assumed that a time difference of around 4-7 second in the time stamp is still a genuine call. Suppose a man in the middle attacker wants to steal John's identity. The attacker will have to wait to the second ringtone to steal the caller id information (4 sec), terminate the original phone call and initiate a fake call sending the stolen caller id (4 sec). In this case, the time stamp is 4 sec plus 4 sec plus processing time equating to more than 8 sec delta than the original call (i.e., bigger than twice the minimum time) so this is deemed a fraudulent call.

While various embodiments of the present disclosure have been particularly shown and described, it will be understood by those skilled in the art that various changes in form and details may be made therein without departing from the spirit and scope of the present disclosure as defined by the appended claims.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A method for detecting a spoofed call, comprising:
   receiving, by processing circuitry, a request to establish a voice call between communications devices, the request comprising encrypted information, a plaintext identifier identifying a caller associated with the request to establish the voice call, and a time stamp, the encrypted information comprising an encrypted identifier and an encrypted time stamp;
   in response to receiving the request, retrieving, by processing circuitry, a decryption key from an authentication source by requesting from the authentication source the decryption key associated with the plaintext identifier;
   utilizing, by processing circuitry, the decryption key to decrypt the encrypted information and produce decrypted information that includes a decrypted identifier and a decrypted time stamp;
   performing, by processing circuitry, a comparison to determine a similarity between (i) the decrypted identifier and the plaintext identifier and (ii) the decrypted time stamp and the time stamp; and
   based on the comparison, providing, by processing circuitry, an indication of whether or not the request is deemed associated with fraud.

2. The method as claimed in claim 1, wherein the authentication source comprises a certificate authority (CA).

3. The method as claimed in claim 1, wherein the indication as provided reveals that the request is either deemed fraudulent or genuine based on whether or not the comparison determines a similarity between (i) the decrypted identifier and the plaintext identifier and (ii) the decrypted time stamp and the time stamp.

4. The method as claimed in claim 3, further comprising: establishing the voice call between the communications device based on the comparison indicating a similarity.

5. The method as claimed in claim 3, further comprising: rejecting the voice call between the communications device based on the comparison indicating an absence of similarity.

6. An apparatus for detecting spoofed call, comprising:
   memory; and
   processing circuitry coupled to the memory, the memory storing instructions which, when executed by the processing circuitry, cause the processing circuitry to:
   receive a request to establish a voice call between communications devices, the request comprising encrypted information, a plaintext identifier identifying a caller associated with the request to establish the voice call, and a time stamp, the encrypted information comprising an encrypted identifier and an encrypted time stamp;
   in response to receiving the request, retrieve a decryption key from an authentication source by requesting from the authentication source the decryption key associated with the plaintext identifier;
   utilize the decryption key to decrypt the encrypted information and produce decrypted information that includes a decrypted identifier and a decrypted time stamp;
   perform a comparison to determine a similarity between (i) the decrypted identifier and the plaintext identifier and (ii) the decrypted time stamp and the time stamp; and
   based on the comparison, provide an indication of whether or not the request is deemed associated with fraud.

7. The apparatus as claimed in claim 6, wherein the authentication source comprises a certificate authority (CA).

8. The apparatus as claimed in claim 6, wherein the indication as provided reveals that the request is either deemed fraudulent or genuine based on whether or not the comparison determines a similarity between (i) the decrypted identifier and the plaintext identifier and (ii) the decrypted time stamp and the time stamp.

9. The apparatus as claimed in claim 8, further comprising: establishing the voice call between the communications device based on the comparison indicating a similarity.

10. The apparatus as claimed in claim 8, further comprising: rejecting the voice call between the communications device based on the comparison indicating an absence of similarity.

11. A computer program product for detecting a spoofed call having a non-transitory computer readable medium which stores a set of instructions, the set of instructions, when carried out by processing circuitry, causing the processing circuitry to perform a method of:
   receiving a request to establish a voice call between communications devices, the request comprising encrypted information, a plaintext identifier identifying a caller associated with the request to establish the voice call, and a time stamp, the encrypted information comprising an encrypted identifier and an encrypted time stamp;
   in response to receiving the request, retrieving a decryption key from an authentication source by requesting from the authentication source the decryption key associated with the plaintext identifier;
   utilizing the decryption key to decrypt the encrypted information and produce decrypted information that includes a decrypted identifier and a decrypted time stamp;
   performing a comparison to determine a similarity between (i) the decrypted identifier and the plaintext identifier and (ii) the decrypted time stamp and the time stamp; and
   based on the comparison, providing an indication of whether or not the request is deemed associated with fraud.

12. The computer program product as claimed in claim 11, wherein the authentication source comprises a certificate authority (CA).

13. The computer program product as claimed in claim 11, wherein the indication as provided reveals that the request is either deemed fraudulent or genuine based on whether or not the comparison determines a similarity between (i) the decrypted identifier and the plaintext identifier and (ii) the decrypted time stamp and the time stamp.

14. The computer program product as claimed in claim 13, further comprising: establishing the voice call between the communications device based on the comparison indicating a similarity.

15. The computer program product as claimed in claim 13, further comprising: rejecting the voice call between the communications device based on the comparison indicating an absence of similarity.

* * * * *